Figure 1:
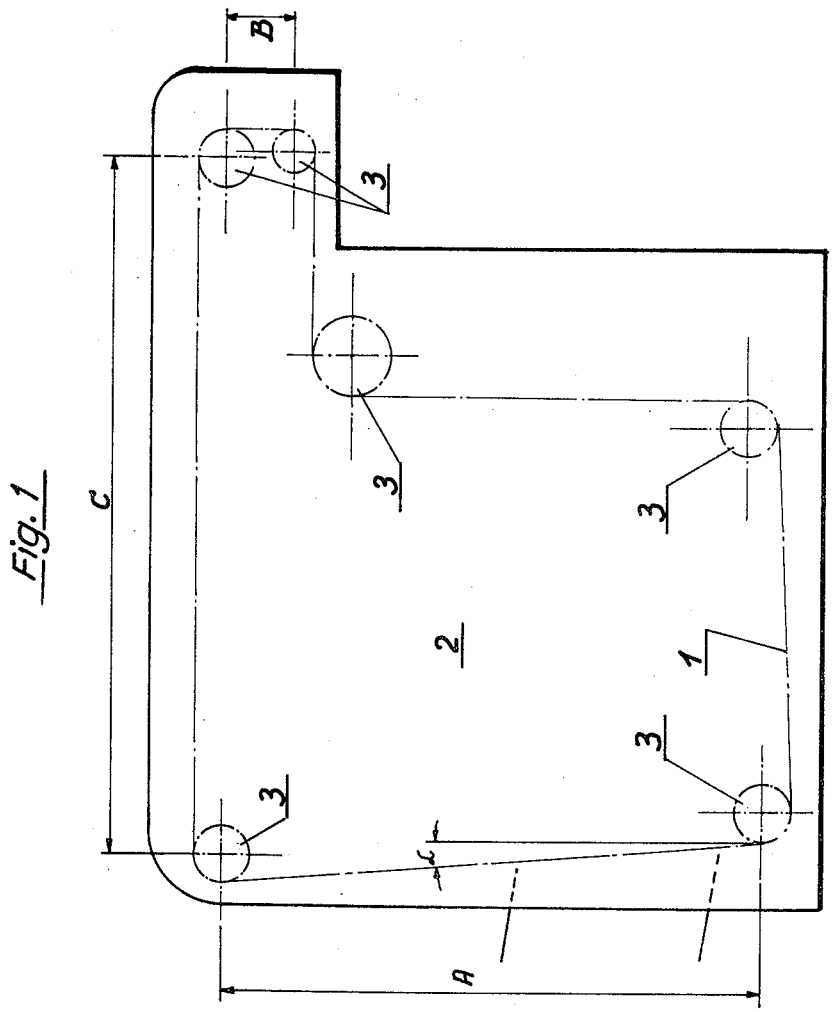

March 2, 1965 W. WELLER ETAL 3,171,532
APPARATUS FOR SEPARATING AND COUNTING ROD-SHAPED OBJECTS
Filed Aug. 24, 1962 4 Sheets-Sheet 1

Inventors
W. Weller
H. H. Knieps
By
Watson Cole Grindle + Watson
Attys.

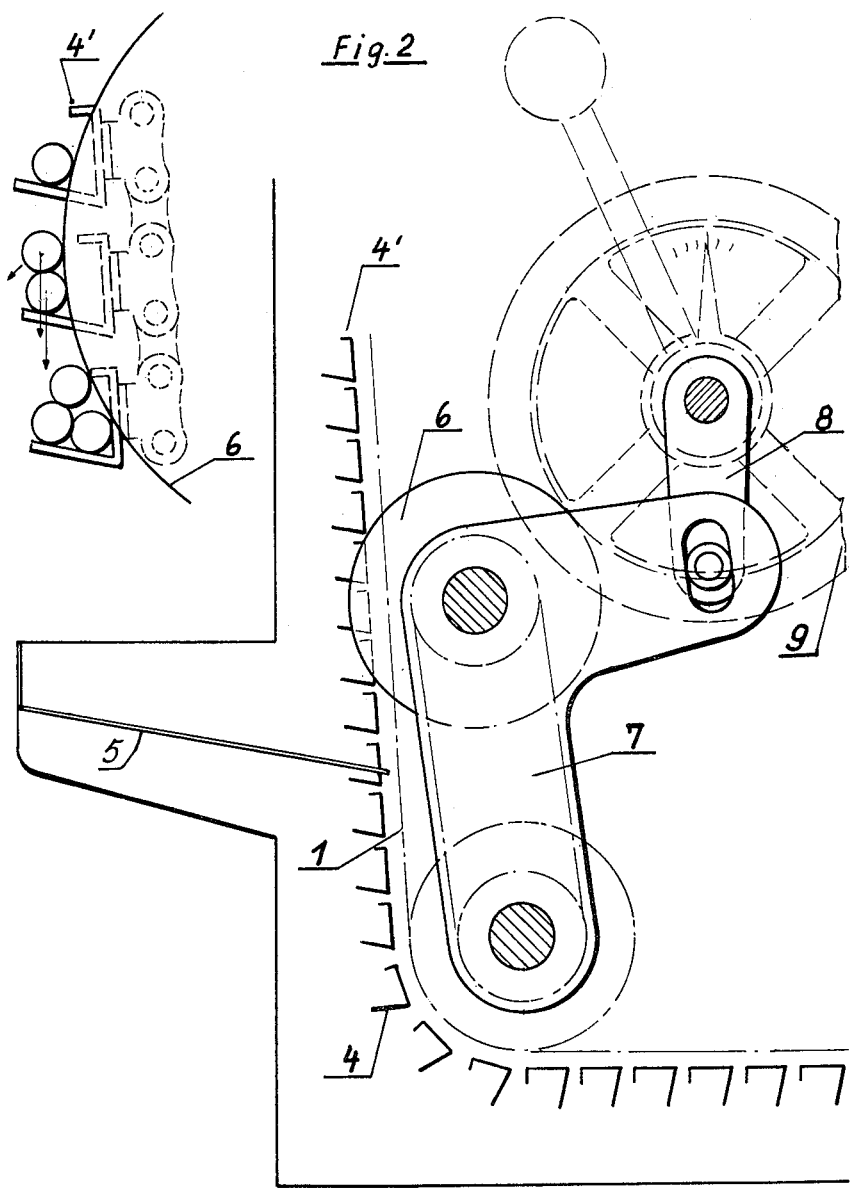

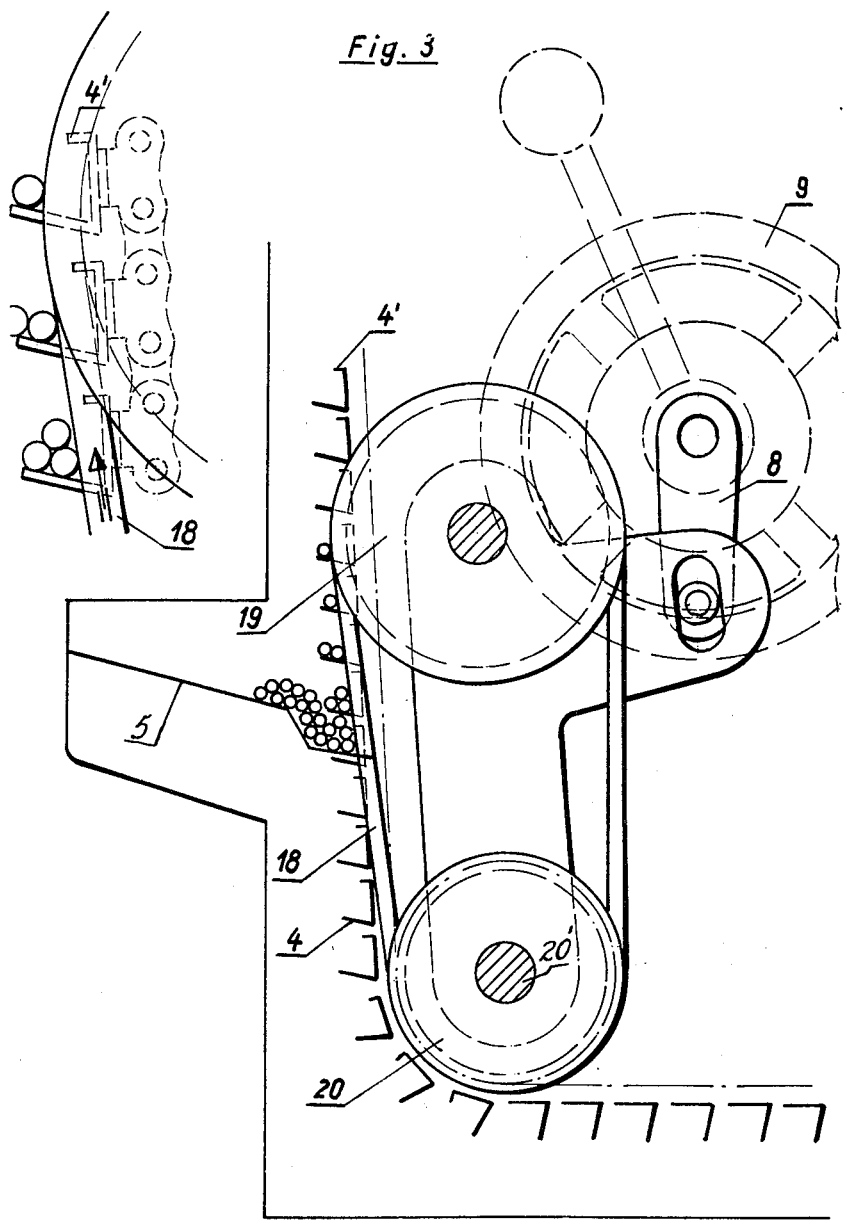

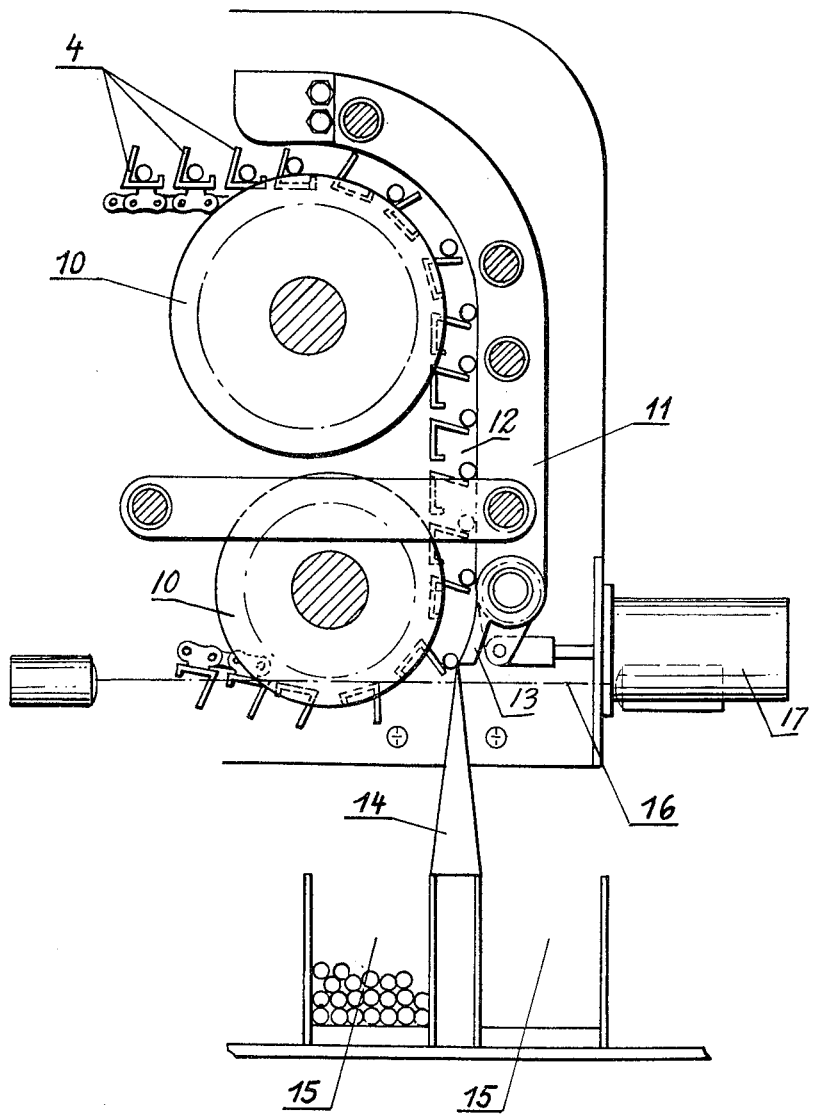

United States Patent Office 3,171,532
Patented Mar. 2, 1965

3,171,532
APPARATUS FOR SEPARATING AND COUNTING ROD-SHAPED OBJECTS
Wilhelm Weller, Welper (Ruhr), and Horst Hilmar Knieps, Wuppertal-Barmen, Germany, assignors to Firma Transporttechnik G.m.b.H., Gevelsberg, Westphalia, Germany
Filed Aug. 24, 1962, Ser. No. 219,169
Claims priority, application Germany, Sept. 4, 1961, T 20,699
10 Claims. (Cl. 198—30)

The idea on which the present invention is based is to grasp rod-shaped objects under manufacture, such as, for example, electrodes, which are conveyed away from the place of production in collecting containers or by conveyor belts, in exact numbers by means of an automatically operating device, with the further object of creating the conditions for the automatic packing of equal numbers of the objects in question.

Accordingly, the invention relates to an apparatus for separating and counting rod-shaped objects, such as electrodes, for instance, which is characterised by a revolving endless conveyor chain or belt equipped with entraining means for the rod-shaped objects and with which there is associated on an ascending conveying path means for feeding and separating the objects and on a descending conveying path means for the locally fixed delivery and the counting of the objects. In a preferred constructional form of the invention, the means for separating the objects in each entraining member are formed by rollers or pairs of rollers rotating at the same peripheral speed as the conveyor chain and which are arranged so that they can be adjusted into the path of the objects carried along by the entraining members in order to transport out of the entraining members again any objects received in excess of one.

According to the invention, in order to create the conditions for automatic packing of equal numbers of the objects in question, swingable cams or pairs of cams are arranged at the end of the descending conveying path to permit the dropping of the objects to be changed over to different containers. The changing over of the cams or pairs of cams is effected by means of a solenoid which receives the changeover pulses from a counting device which counts the objects brought up to it at any given time by means of a beam of light.

The object of the invention is illustrated by way of example in the drawing, in which:
FIG. 1 is a diagrammatic view of the representation of the invention;
FIGS. 2 to 4 are diagrammatic side views showing details of the invention.

The apparatus according to the invention is characterised by a revolving endless conveyor chain 1 equipped with entraining members for the rod-shaped objects, for example electrodes, and which is enclosed by a housing 2. By a suitable arrangement of the guide wheels 3, one or the other of which is used for driving the chain, there are created at the end faces of the housing 1 an ascending conveying path A, with which means for feeding and separating the objects are associated, and a descending conveying path B, with which means for the locally fixed delivery and counting of the objects are associated.

According to FIG. 2, to the conveyor chain 1 there are attached entraining members 4 in the form of angle sections, the primary function of which is to withdraw from the supply of electrodes, for example, brought up by means of the chute 5, those which are ready to be grasped; the maximum number would be three electrodes, as is illustrated on the left of FIG. 2. This is followed by the separating process, which is effected by two rollers 6 which laterally overlap the conveyor chain 1 and partially the entraining members 4. These rollers 6, which are driven at the same rotational speed as the conveyor chain, are mounted in a rocker 7 which can be shifted by means of a lever 8 by the handwheel 9. Depending on the diameter of the electrodes, the rollers 6 are adjusted to project to a greater or lesser extent into the path of the objects which are carried upwardly, so that in any particular instance they leave only one electrode in each entraining member, while the surplus electrodes fall down on to the chute. This separating process is assisted in that the ascending conveying path A is given an inclination directed outwardly at the angle α and for the entraining members 4 angle profiles are selected in which the self-supporting sides or arms, which form the support, are directed slightly upwardly. In this way it is also ensured that the individual electrodes do not drop out of their entraining members again of their own accord. In order also to ensure, where the following horizontal conveying path C is concerned, that the electrodes cannot drop out, the angle profiles have abutment edges 4'.

According to FIG. 3, the separation of the objects is effected by means of a belt or pair of belts 18 which are placed around the pulleys 19 and 20 and are driven at a rotational speed somewhat higher than that of the conveyor chain. The effect of this increased rotational speed is that the rod-shaped objects are twisted out of their supported position on the angle profiles 4 in order to prevent all action of sliding force on the surfaces of the objects. For adjustment purposes, the pulley and belt assembly is adapted to be swung about the shaft 20' of the pulley 20.

According to FIG. 4, at the point of deflection into the descending conveying path B there are arranged pulleys or pairs of pulleys 10 which lift the electrodes brought up out of their entraining members 4 and allow them to roll down on to the back of the particular entraining member located in front. In order to prevent the electrodes dropping out during the downward movement, guide plates 11 are fitted which define the shaft 12 on the outside. At the lower end of the guide plates there are pivotally mounted two cams 13 which, by means of a separating cone 14, allow the electrodes to drop either into the right-hand or the left-hand sheet-metal holder or box 15. The reversal of the cams is effected whenever the last electrode out of a set number has passed through the light beam 16 of a counting device. At this moment, the solenoid 17 of the counting device receives a control impulse by which the cam 13 is then reversed for continued conveyance into the other sheet-metal holder 15.

The apparatus described can also be used solely for separating the electrodes, in order, for example, to enable the electrodes to be separately stamped or branded along a conveying path. Only in a second apparatus arranged on the exit side and which is completed by an electrode counting machine and a light barrier for counting the electrodes, would the counting operation proper then be carried out. The sheet-metal holders 15 are preferably directly so designed that the electrodes stored therein can be conveyed directly by means of a ram or plunger into packing covers which, for example, are carried past on a travelling conveyor belt at the open ends of the holders. With the apparatus according to the invention, it is possible in this way to produce fully automatically or semi-automatically finished packages containing a certain number of electrodes.

We claim:
1. Apparatus for separating rod-shaped objects such as electrodes comprising an endless conveying member having spaced entraining members secured thereon for the rod-shaped objects, said conveying member having and ascending stretch, a plurality of rollers mounted to overlap the endless conveying member and partially the entraining members at the ascending stretch, and means for adjusting the rollers which are driven at the same speed as the conveying member to uniformly limit the number of objects on each entraining member.

2. Apparatus according to claim 1, in which the endless conveying member is in the form of a chain.

3. Apparatus according to claim 1, in which the means for adjusting the rollers includes means to adjust the overlap of the rollers relative to the conveying member.

4. Apparatus according to claim 1, in which the means for adjusting the rollers includes means to adjust the overlap of the rollers relative to the conveying member and including a rocker arm.

5. Apparatus according to claim 1, in which each entraining member is in the form of an angle section of approximately trough-shape in cross-section with a bottom portion and two side portions of which one side portion is longer than the other side portion with the longer side portion being at the bottom when the conveying member is in the ascending stretch and with the opening of each trough-shaped entraining member facing outwardly during said travel stretch.

6. Apparatus according to claim 1, in which each entraining member is in the form of an angle section of approximately trough-shape in cross-section with a bottom portion and two side portions of which one side portion is longer than the other side portion with the longer side portion being at the bottom when the conveying member is in the ascending stretch and with the opening of each trough-shaped entraining member facing outwardly during said travel stretch so that in cooperation with the rollers each ascending entraining member will retain only one rod-shaped object with the others having been removed from the entraining member.

7. Apparatus according to claim 1, in which each entraining member is in the form of an angle section of approximately trough-shape in cross-section with a bottom portion and two side portions of which one side portion is longer than the other side portion with the longer side portion being at the bottom when the conveying member is in the ascending stretch and with the opening of each trough-shaped entraining member facing outwardly during said travel stretch so that in cooperation with the rollers each ascending entraining member will retain only one rod-shaped object with the others having been removed from the entraining member.

8. Apparatus for separating rod-shaped objects such as electrodes comprising an endless conveying member having spaced entraining members secured thereon for the rod-shaped objects, said conveying member having an ascending stretch, at least one belt adapted to be driven at a speed somewhat higher than the speed of the endless conveying member and mounted to partially overlap the entraining members at the ascending stretch, and means for adjusting the belt to uniformly limit the number of objects on each entraining member.

9. Apparatus according to claim 8, in which the means for adjusting the belt includes means to adjust the overlap of the entraining members.

10. Apparatus according to claim 8, in which the means for adjusting the belt includes means to adjust the overlap of the entraining members and including a rocker arm.

References Cited by the Examiner
UNITED STATES PATENTS

| | | | |
|---|---|---|---|
| 703,062 | 6/02 | Havens | 221—253 XR |
| 1,440,744 | 1/23 | Phillippe. | |
| 2,528,196 | 10/50 | Von Till et al. | 221—253 XR |
| 2,632,588 | 3/53 | Hoar | 221—7 XR |
| 2,764,274 | 9/56 | Griswold et al. | 198—30 |
| 2,781,946 | 2/57 | Wilcox et al. | 221—161 XR |
| 2,840,269 | 6/58 | Anderson | 221—253 XR |
| 2,936,059 | 5/60 | Hakogi | 198—30 |
| 2,955,696 | 10/60 | Spooner | 198—30 |
| 3,000,537 | 9/61 | Simon | 221—253 XR |

SAMUEL F. COLEMAN, *Primary Examiner.*

KENNETH N. LEIMER, ERNEST A. FALLER,
*Examiners.*